(12) United States Patent
Jin

(10) Patent No.: US 10,976,852 B2
(45) Date of Patent: Apr. 13, 2021

(54) TOUCH PANEL, MANUFACTURING METHOD THEREOF, AND DISPLAY DEVICE

(71) Applicant: Yungu (Gu'an) Technology Co., Ltd., Langfang (CN)

(72) Inventor: Huijiao Jin, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 16/716,399

(22) Filed: Dec. 16, 2019

(65) Prior Publication Data

US 2020/0117307 A1 Apr. 16, 2020

Related U.S. Application Data

(63) Continuation of application No. PCT/CN2019/071229, filed on Jan. 10, 2019.

(30) Foreign Application Priority Data

Jun. 30, 2018 (CN) .......................... 201810704542.5

(51) Int. Cl.
*G06F 3/041* (2006.01)
*G06F 3/045* (2006.01)

(52) U.S. Cl.
CPC ............ *G06F 3/0412* (2013.01); *G06F 3/045* (2013.01); *G06F 2203/04102* (2013.01); *G06F 2203/04103* (2013.01)

(58) Field of Classification Search
CPC ........... G06F 3/041; G06F 3/045; G06F 3/042
See application file for complete search history.

(56) References Cited

U.S. PATENT DOCUMENTS

| | | | | |
|---|---|---|---|---|
| 4,202,606 A | * | 5/1980 | Wild | G02F 1/1345 349/142 |
| 4,587,038 A | * | 5/1986 | Tamura | B82Y 10/00 252/511 |

(Continued)

FOREIGN PATENT DOCUMENTS

| | | |
|---|---|---|
| CN | 101292362 A | 10/2008 |
| CN | 102087884 A | 6/2011 |

(Continued)

OTHER PUBLICATIONS

First Office Action of Chinese Application No. 201810704542.5.
(Continued)

*Primary Examiner* — Pegeman Karimi
(74) *Attorney, Agent, or Firm* — Kilpatrick Townsend & Stockton

(57) ABSTRACT

The present application discloses a touch panel, manufacturing method thereof, and display device. The touch panel comprises a substrate having a first region and a second region surrounding the first region; a wiring layer, located on the second region; and a conductive layer, located on the first region and directly covering part of the wiring layer, and an exposed part of the wiring layer being formed as a wiring lead-out area of the touch panel. The method of manufacturing a touch panel, comprises providing a substrate having a first region and a second region surrounding the first region; forming a wiring layer on the second region; and forming a conductive layer located on the first region and directly covering part of the wiring layer, and an exposed part of the wiring layer being formed as a wiring lead-out area of the touch panel.

19 Claims, 4 Drawing Sheets

(56) References Cited

U.S. PATENT DOCUMENTS

| | | | |
|---|---|---|---|
| 9,798,434 B2* | 10/2017 | Lee | G06F 3/04164 |
| 2010/0302206 A1* | 12/2010 | Yu | G06F 3/041 |
| | | | 345/174 |
| 2012/0139871 A1* | 6/2012 | Ku | G06F 3/0446 |
| | | | 345/174 |
| 2013/0063371 A1 | 3/2013 | Lee et al. | |
| 2015/0084887 A1* | 3/2015 | Kuo | G06F 1/1626 |
| | | | 345/173 |
| 2016/0313827 A1* | 10/2016 | Song | G06F 3/0412 |
| 2018/0356925 A1* | 12/2018 | Liu | G02F 1/13338 |
| 2019/0004642 A1* | 1/2019 | Chen | G06F 3/0443 |
| 2019/0371830 A1* | 12/2019 | Hsiao | H05K 1/09 |

FOREIGN PATENT DOCUMENTS

| | | |
|---|---|---|
| CN | 102479015 A | 5/2012 |
| CN | 102819338 A | 12/2012 |
| CN | 105183246 A | 12/2015 |
| CN | 205899520 U | 1/2017 |
| CN | 108549503 A | 9/2018 |
| EP | 1922759 B1 | 8/2012 |
| WO | 2016158419 A1 | 10/2016 |

OTHER PUBLICATIONS

International Search Report of Application No. PCT/CN2019/071229.
Second Office Action of Chinese Application No. 201810704542.5.
Third Office Action of Chinese Application No. 201810704542.5.
Written Opinion of International Application No. PCT/CN2019/071229.

* cited by examiner

TOUCH PANEL, MANUFACTURING METHOD THEREOF, AND DISPLAY DEVICE

CROSS-REFERENCES TO RELATED APPLICATIONS

This application is a continuation application to PCT Application No. PCT/CN2019/071229, filed on Jan. 10, 2019, which claims priority to Chinese Patent Application No. 201810704542.5, filed on Jun. 30, 2018, titled "Touch panel, manufacturing method thereof, and display device", and the entire contents of which are incorporated herein by reference.

TECHNICAL FIELD

The present application relates to the field of display technologies, and in particular, to a touch panel, a method of manufacturing the touch panel, and a display device.

BACKGROUND

Touch Panels are applied more and more in the fields of display technology such as visitor navigation systems, automated teller machines, portable electronic products, and industrial control systems due to their convenient use. The material of the touch electrode of the conventional touch panel is usually indium tin oxide (ITO).

SUMMARY

The technical problem to be solved by the present application is to provide a touch panel, a manufacturing method thereof, and a display device, in order to improve the touch effect of the touch panel, to meet the design requirements of the narrow bezel and the market demand of the display device.

To solve the above technical problems and related problems, in one aspect, an embodiment of the present application provides a touch panel, wherein the touch panel comprises: a substrate, having a first region and a second region surrounding the first region; a wiring layer, located on the second region; and a conductive layer, located on the first region and directly covering part of the wiring layer, and an exposed part of the wiring layer being formed as a wiring lead-out area of the touch panel.

Optionally, a contact area of the conductive layer in direct contact with the wiring layer is greater than or equal to 0.25 $mm^2$ in the touch panel.

Optionally, the touch panel further comprises an over coating covering on the conductive layer.

Optionally, the over coating is an insulating cement layer in the touch panel.

Optionally, a material of the over coating comprises an optical cement in the touch panel.

Optionally, a material of the conductive layer in the touch panel comprises a metal nanowire, and a material of the wiring layer comprises one or more of a silver wire, a gold wire, an indium tin oxide, a metal mesh and a graphene.

Optionally, the conductive layer in the touch panel is in a form of mesh structure; and the over coating is partially embedded in the conductive layer in a thickness direction thereof.

Optionally, the conductive layer in the touch panel is a silver nanowire layer, and the silver nanowire layer has a silver nanowire, a length of the silver nanowire being between 10 μm and 300 μm, a diameter of the silver nanowire being less than 500 nm and a ratio of the silver nanowire being greater than 10 of the length to the diameter of the silver nanowire.

Optionally, the substrate is a rigid substrate or a flexible substrate in the touch panel.

According to other aspects of the present application, an embodiment of the present application further provides a display device comprising the above touch panel, wherein the conductive layer functions as a touch electrode of the display device, and the wiring layer functions as an interconnection line of the touch electrode, and the wiring lead-out area corresponds to a border area of the display device.

According to other aspect of the present application, an embodiment of the present application further provides a method of manufacturing a touch panel, comprising: providing a substrate having a first region and a second region surrounding the first region; forming a wiring layer on the second region; and forming a conductive layer located on the first region and directly covering part of the wiring layer, and an exposed part of the wiring layer being formed as a wiring lead-out area of the touch panel.

Optionally, in the method of manufacturing a touch panel, the forming the wiring layer comprises printing, sputtering, or evaporation.

Optionally, in the method of manufacturing a touch panel, the forming the conductive layer comprises inkjeting, spreading, gravure printing, relief printing, flexographic printing, nanoimprinting, screen printing, and blade coating, spin coating, stylus plotting, slot coating or flow coating.

Optionally, the manufacturing method further comprises forming an over coating covering on the conductive layer.

Compared with the prior art, the embodiments of the present application have the following beneficial effects:

The touch panel in the embodiments of the present application comprises: a substrate, having a first region and a second region surrounding the first region; a wiring layer, located on the second region; and a conductive layer, located on the first region and directly covering part of the wiring layer, and an exposed part of the wiring layer being formed as a wiring lead-out area of the touch panel. The manufacturing method of the touch panel comprises: providing a substrate having a first region and a second region surrounding the first region; forming a wiring layer on the second region; and forming a conductive layer located on the first region and directly covering part of the wiring layer, and an exposed part of the wiring layer being formed as a wiring lead-out area of the touch panel. Since the conductive layer directly covers part of the wiring layer, the wiring layer is in direct contact with the conductive layer, so that an effective contact area between the conductive layer and the wiring layer is easily controlled, which is advantageous for stabilizing contact resistance between them and thereby improving the touch effect of the touch panel. In addition, since part of the wiring layer is covered by the conductive layer, and an exposed part of the wiring layer is used as a wiring lead-out area, so that the wiring lead-out area can be reduced area accordingly. Furthermore, the exposed part of the wiring layer corresponds to the border area of the touch panel, so that the border area of the touch panel can be reduced size, and therefore the design requirements for a narrow border can be realized in the present touch panel and the market demand for narrow borders of display devices can be satisfied accordingly.

Furthermore, the contact area of the conductive layer in direct contact with the wiring layer is greater than or equal to 0.25 $mm^2$, so that a good electrical connection between the conductive layer and the wiring layer can be achieved, which leads to a good signal transmission and strong anti-interference ability of the touch panel.

Furthermore, an over coating is formed on the conductive layer, and the over coating can increase the adhesion between the conductive layer and the substrate, improve the conductivity and sensitivity of the touch panel, and further improve the touch effect of the touch panel.

DETAILED DESCRIPTION OF THE INVENTION

Figure 1:
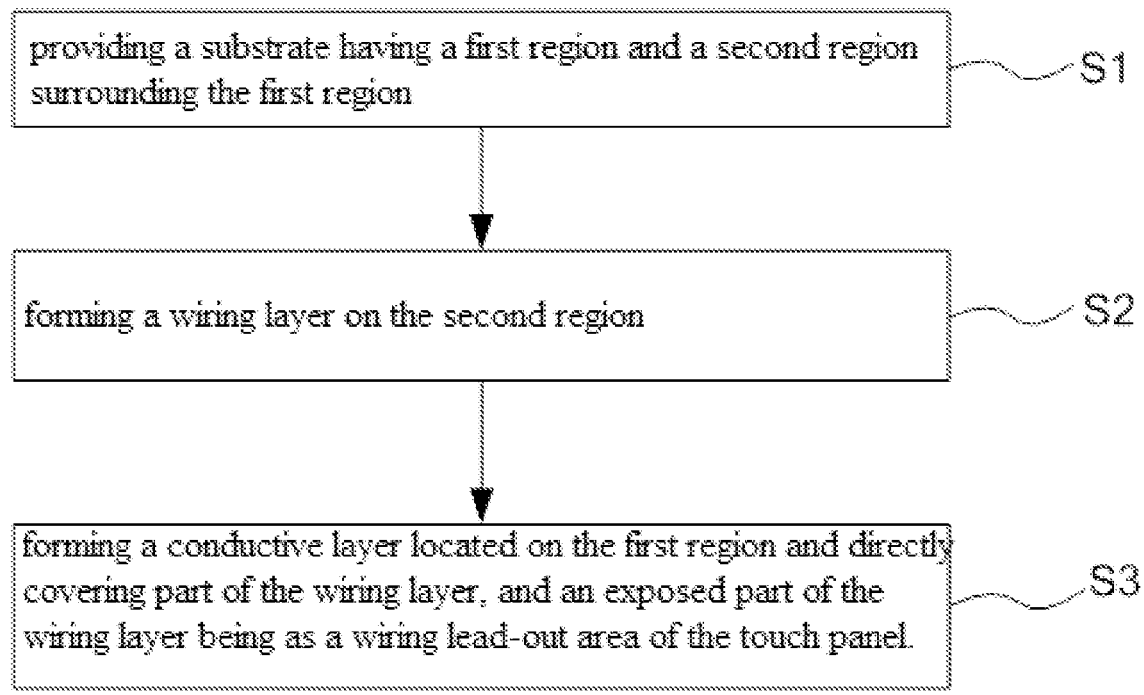
FIG. 1 is a flowchart of a method for manufacturing a touch panel according to an embodiment of the present application.

The touch panel is restricted to develop to be flexible due to problems of the ITO film such as brittleness, conductivity, and light transmittance. At present, the alternative materials for ITO has been developed in the industry, and among the alternative materials, metal nanowires have superior mechanical properties, especially silver nanowires have excellent electrical conductivity, and have excellent light transmittance and flexural resistance due to their nano-level size effects. Therefore, the metal nanowires can be used instead of ITO as the materials for manufacturing the touch electrode. However, the touch effect of the existing touch panels does not meet the expectation, and it is difficult to achieve the design requirements for a narrow border.

The inventors have found that in the preparation process of the silver nanowire touch panel, a silver nanowire solution is usually directly coated on the substrate to form a silver nanowire conductive layer. However, a lap-joint of the silver nanowire conductive layer is constructed only by weak intermolecular force. Therefore, the bonding strength between the silver nanowire conductive layer and the substrate is poor, and a slip may easily occur during a bending process, which leads to a high and unstable resistance for the touch panel. Therefore, the inventors attempted to coat an over coating on the silver nanowire conductive layer. Usually, the over coating is a transparent insulating cement layer, such as an optical cement layer, and the coated over coating can improve the adhesion between the silver nanowire conductive layer and the substrates. However, since the wiring layer is formed on the over coating, the coated over coating reduces an effective contact area between the silver nanowire conductive layer and the wiring layer, and increase the contact resistance between them, therefore the touch effect of the touch panel is degraded, wherein an effective contact area refers to a contact area that the conductive layer and the wiring layer are in contact with each other and performs the function of electric conduction in the portion. Therefore, in order to ensure the touch effect of the touch panel, it is necessary to expand the contact area between the silver nanowire conductive layer and the wiring layer on the basis of the above structure, and the contact area determines the size of the border area of the touch panel. Therefore, the design requirements for narrow border are difficult to be realized in this touch panel, and thus it is difficult to meet the market demand of the display device.

Based on the above, an embodiment of the present application provides a touch panel comprising a substrate having a first region and a second region surrounding the first region; a wiring layer located on the second region; and a conductive layer, located on the first region and directly covering part of the wiring layer, and an exposed part of the wiring layer being formed as a wiring lead-out area of the touch panel. Since the conductive layer directly covers part of the wiring layer, the wiring layer is in direct contact with the conductive layer, so that an effective contact area between the conductive layer and the wiring layer is easily controlled, which is advantageous for stabilizing contact resistance between them and thereby improving the touch effect of the touch panel. In addition, since part of the wiring layer is covered by the conductive layer, and an exposed part of the wiring layer is used as a wiring lead-out area, so that the wiring lead-out area can be reduced area accordingly. Furthermore, the exposed part of the wiring layer corresponds to the border area of the touch panel, so that the border area of the touch panel can be reduced size, and therefore, the design requirements for a narrow border can be realized in the present touch panel and the market demand for narrow borders of display devices can be satisfied accordingly.

In the meantime, an embodiment of the present application further provides a method for manufacturing a touch panel. As shown in FIG. 1, a method for manufacturing a touch panel according to an embodiment of the present application comprises:

Step S1, a substrate having a first region and a second region surrounding the first region is provided ;

Step S2, a wiring layer on the second region is formed, and;

Step S3, a conductive layer located on the first region and directly covering part of the wiring layer is formed, and an exposed part of the wiring layer is regarded as a wiring lead-out area of the touch panel.

In the manufacturing method, the wiring layer is firstly formed on the second region, and then the conductive layer is formed, and the conductive layer is located on the first region and directly covers part of the wiring layer, and the exposed part of the wiring layer functions as a wiring lead-out area, so that the wiring layer is in direct contact with the conductive layer, and the wiring lead-out area can be reduced area. Therefore, the manufacturing method can not only improve the touch effect of the touch panel, but also realize the design requirements of the narrow border, thereby meeting the market demand for the narrow border of the display device.

The touch panel, the manufacturing method thereof and the display device are described in detail below with reference to FIG. 1 to FIG. 4 to clearly set forth the disclosure of the present application. It should be understood that the content of the present application is not limited to the following embodiments, other improvements of conventional techniques by those skilled in the art also fall in the scope of the present application. It should be noted that the drawings are shown in a very simplified form with non-precise scale, and are only for convenience and clarity to describe the purpose of the embodiments of the present application.

Figure 2:
FIG. 2 to FIG. 4 are schematic structural views corresponding to each step in the method for manufacturing the touch panel according to the embodiment of the present application.

Firstly, step S1 is performed to provide a substrate 10 having a first region A1 and a second region A2 surrounding the first region A1, as shown in FIG. 2.

In this embodiment, the substrate 10 may have a square shape, and the second region A2 has a square ring shape. The substrate 10 is generally made of a transparent insulating material, and can be a rigid substrate, the material of which can be materials such as glass, metal, or ceramics, etc.; the substrate 10 can also be a flexible substrate, the material of which can be, but not limited to materials comprising acrylics, polymethyl methacrylate (PMMA), polyacrylonitrile-butadiene-styrene (ABS), polyamide (PA), polyimide (PI), Polybenzimidazole polybutene (PB), polybutylene terephthalate (PBT), polycarbonate (PC), polyetheretherketone (PEEK), polyetherimide (PEI), polyether sulfone (PES), polyethylene (PE), polyethylene terephthalate (PET), polyethylene tetrafluoroethylene (ETFE), polyethylene oxide, polyglycolic acid (PGA), polymethylpentene (PMP), polyoxymethylene (POM), polyphenylene ether (PPE), polypropylene (PP), polystyrene (PS), polytetrafluoroethylene (PTFE), polyurethane (PU), polyvinyl chloride (PVC), polyvinyl fluoride (PVF), polyvinylidene chloride (PVDC), polyvinylidene fluoride (PVDF) or styrene-acrylonitrile (SAN), etc.. In this embodiment, the flexible substrate is made of polyimide.

Secondly, step S2 is performed to form the wiring layer 11, and the wiring layer 11 is located on the second region A2, as shown in FIG. 2.

Preferably, a material of the wiring layer 11 comprises one or more of a gold wire, a silver wire, an indium tin oxide, a metal mesh and a graphene. The forming the wiring layer 11 specifically comprises, but is not limited to printing (such as gravure printing, relief printing, flexographic printing, or transfer printing, etc.), sputtering, or evaporation, etc. The wiring layer 11 functions as an interconnection line for touch electrodes in the following steps.

Figure 3:
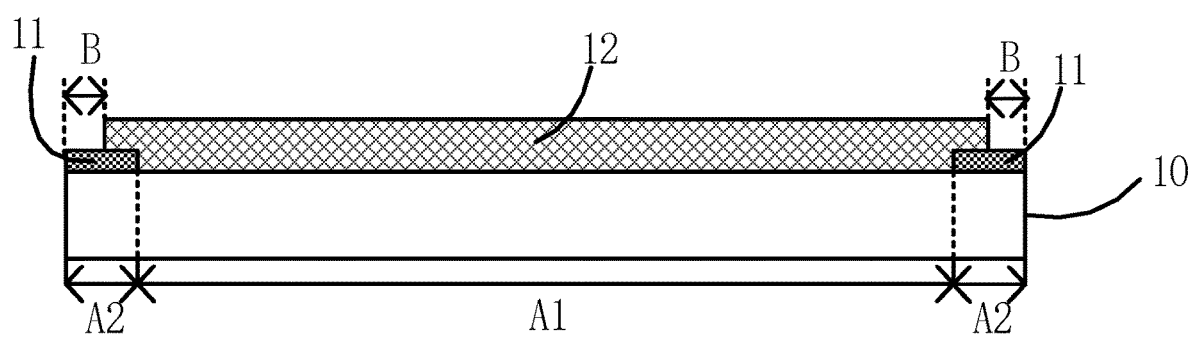

Thirdly, step S3 is performed to form a conductive layer 12, the conductive layer 12 is located on the first region A1 and directly covers part of the wiring layer 11, and an exposed part of the wiring layer 11 functions as a wiring lead-out area B, as shown in FIG. 3.

The conductive layer 12 functions as a touch electrode of the touch panel. Correspondingly, the conductive layer 12 corresponds to a touch area of the touch panel, and the wiring lead-out area B corresponds to a border area of the touch panel. The touch area is a display area of the display device, which is also referred to as a viewing area. The viewing area is generally used for light transmission display, and the border area is generally lighttight to highlight the display content of the viewing area. Therefore, the wiring layer 11 is in direct contact with the conductive layer 12, so that the effective contact area between them is easily controlled, which is advantageous for stabilizing the contact resistance between them, thereby improving the touch effects of the touch panel. In addition, since part of the wiring layer 11 is covered by the conductive layer 12, so that the wiring lead-out area B can be reduced area accordingly, that is the size of the border area of the touch panel can be reduced, thereby realizing the design requirements for narrow borders.

Preferably, a material of the conductive layer 12 comprises a metal nanowire, which can be, but not limited to, a gold nanowire or a silver nanowire. In the present embodiment, since the silver is a silver-white metal in a general state and is an opaque material with excellent conductivity, and therefore the conductive layer 12 is preferably a silver nanowire layer. The silver nanowire layer has a silver nanowire, a length of the silver nanowire being between 10 μm and 300 μm, a diameter (i.e. wire width) of the silver nanowire being less than 500 nm and a ratio of the silver nanowire being greater than 10 of the length to the diameter of the silver nanowire. The forming the conductive layer 12 comprises, but is not limited to inkjeting, spreading, gravure printing, relief printing, flexographic printing, nanoimprinting, screen printing, and blade coating, spin coating, stylus plotting, slot coating or flow coating. Furthermore, in order to ensure a better touch effect of the touch panel, the contact area of the conductive layer 12 in direct contact with the wiring layer 11 is greater than or equal to 0.25 mm$^2$, so that a good electrical connection between the conductive layer 12 (the touch electrode) and the wiring layer 11 (the interconnection line of the touch electrodes) can be achieved, which leads to a good signal transmission and strong anti-interference ability of the touch panel.

Figure 4:
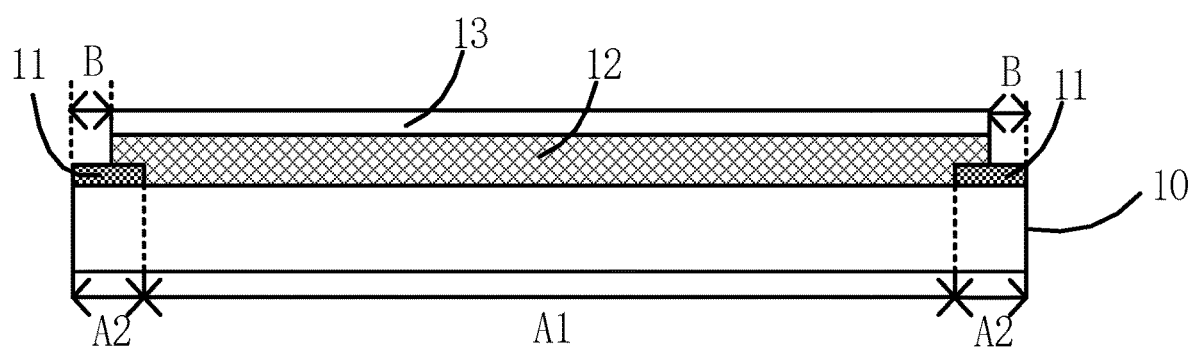

Furthermore, after completing the above steps, in order to further enhance the adhesion of the conductive layer 12 to the substrate 10, an over coating 13 can also be formed on the conductive layer 12, as shown in FIG. 4. The over coating 13 can be an insulating cement layer, such as one or more of a phenolic resin, a polyvinyl chloride resin, a transparent optical cement, etc.. In this embodiment, the material of the over coating 13 is a transparent optical cement. The forming the over coating 13 can comprises a transparent optical cement solution is coated on the conductive layer 12 by a spraying process; followed by drying and solidifying to form the over coating 13. Further, the transparent optical cement solution has fluidity, and the conductive layer 12 is generally in a form of a mesh. Before curing, the transparent optical cement solution can infiltrate into the conductive layer 12, so that the over coating 13 formed after curing is at least partially embedded in the conductive layer 12 in the thickness direction thereof, therefore the silver nanowire can be better adhered to the substrate 10, so that the silver nanowire is less likely to move, and the lap-joint is stronger, thereby increasing the conductivity and sensitivity of the touch panel.

In the above manufacturing method, the wiring layer 11 is firstly formed on the second region A2, and then the conductive layer 12 is formed, and the conductive layer 12 is located on the first region and directly covers part of the wiring layer 11, and the exposed part of the wiring layer 11 functions as a wiring lead-out area B, so that the wiring layer 11 is in direct contact with the conductive layer 12, and the area of the wiring lead-out area B can be reduced. Therefore, the manufacturing method can not only improve the touch effect of the touch panel, but also the design requirements of the narrow border can be realized.

Correspondingly, the touch panel formed by the above manufacturing method comprises: a substrate 10 having a first region A1 and a second region A2 surrounding the first region A1; and a wiring layer 11 located on the second region A2; a conductive layer 12 located on the first region A1 and directly covering part of the wiring layer 11, wherein a contact area of the conductive layer in direct contact with the wiring layer is greater than or equal to 0.25 mm$^2$ and an exposed part of the wiring layer 11 functions as a wiring lead-out area B of the touch panel; and an over coating 13 covering on the conductive layer 12. Since the wiring layer 11 is in direct contact with the conductive layer 12, so that an effective contact area between the conductive layer and the wiring layer is easily controlled, which is advantageous for stabilizing contact resistance between them and thereby improving the touch effect of the touch panel. In addition, since part of the wiring layer 11 is covered by the conductive layer 12, and the exposed part of the wiring layer 11 is used as a wiring lead-out area B, therefore the area of the wiring lead-out area B can be reduced accordingly. Furthermore, the exposed part of the wiring layer corresponds to the border area of the touch panel, so that the size of the border area of the touch panel can be reduced, and therefore the design requirements for a narrow border can be realized in the present touch panel.

Obviously, the manufacturing method of the touch panel is not limited to the above manufacturing methods.

Finally, the present embodiment provides a display device comprising the above touch panel, wherein the conductive layer 12 functions as a touch electrode of the display device, the wiring layer 11 functions as an interconnection line of the touch electrodes of the display device, and the lead-out area B corresponds to a border area of the display device, by this way, the display device can meet the market demand for the display device with narrow border. The display device can be, but not limited to, any product or component having a display function such as a liquid crystal display panel, an electronic paper, a mobile phone, a tablet computer, a television, a display, a notebook computer, a digital photo frame, a navigator, etc.

In summary, the touch panel of the present application comprises a substrate, having a first region and a second region surrounding the first region; a wiring layer located on the second region; and a conductive layer, located on the first region and directly covering part of the wiring layer, and an exposed part of the wiring layer being formed as a wiring lead-out area of the touch panel. The manufacturing method of the touch panel comprises: providing a substrate having a first region and a second region surrounding the first region; forming a wiring layer on the second region; and forming a conductive layer located on the first region and directly covering part of the wiring layer, and an exposed part of the wiring layer being formed as a wiring lead-out area. Since the conductive layer directly covers part of the wiring layer, the wiring layer is in direct contact with the conductive layer, so that an effective contact area between the conductive layer and the wiring layer is easily controlled, which is advantageous for stabilizing contact resistance between them and thereby improving the touch effect of the touch panel. In addition, the exposed part of the wiring layer corresponds to the border area of the touch panel, and since part of the wiring layer is covered by the conductive layer, and the exposed part of the wiring layer is used as a wiring lead-out area, so that the area of the wiring lead-out area can be reduced accordingly that is the size of the border area of the touch panel can be reduced, and therefore the design requirements for a narrow border can be realized in the present touch panel and the market demand for narrow borders of display devices can be meet.

Furthermore, a contact area of the conductive layer in direct contact with the wiring layer is greater than or equal to 0.25 mm$^2$, so that a good electrical connection between the conductive layer and the wiring layer can be achieved, which leads to a good signal transmission and strong anti-interference ability of the touch panel.

Furthermore, an over coating is formed on the conductive layer, and the over coating can increase the adhesion between the conductive layer and the substrate, improve the conductivity and sensitivity of the touch panel, and further improve the touch effect of the touch panel.

It will be apparent to those skilled in the art that various modifications and changes can be made in the present application without departing from the spirit and scope of the application. Thus, the present application is intended to comprise the modifications and variations to the present application if these modifications and variations fall in the scope of the present claims and the equivalents thereof.

The invention claimed is:

1. A touch panel comprising:
    a substrate, having a first region corresponding to a viewing area and a second region surrounding the first region;
    a wiring layer, located on the second region;
    a conductive layer, located on the first region and directly covering part of the wiring layer, and an exposed part of the wiring layer being formed as a wiring lead-out area of the touch panel, the lead-out area corresponding to a lighttight border area of the touch panel, and
    an over coating directly covering on the conductive layer, wherein a material of the over coating comprises an optical cement,
    wherein the conductive layer is in a form of mesh structure, and the over coating is partially embedded in the conductive layer in a thickness direction thereof to expose the wiring lead-out area.

2. The touch panel of claim 1, wherein a contact area of the conductive layer in direct contact with the wiring layer is greater than or equal to 0.25 mm$^2$.

3. The touch panel of claim 1, wherein the over coating is an insulating optical cement layer.

4. The touch panel of claim 1, wherein a material of the conductive layer comprises a metal nanowire, and a material of the wiring layer comprises one or more of a silver wire, a gold wire, an indium tin oxide, a metal mesh and a graphene.

5. The touch panel of claim 4, wherein the conductive layer is a silver nanowire layer, and the silver nanowire layer has a silver nanowire, a length of the silver nanowire being between 10 μm and 300 μm, a diameter of the silver nanowire being less than 500 nm and a ratio of the silver nanowire being greater than 10 of the length to the diameter of the silver nanowire.

6. The touch panel of claim 1, wherein the substrate is a rigid substrate or a flexible substrate.

7. The touch panel of claim 6, wherein the substrate comprises a rigid substrate, the material of which comprises glass, metal, or ceramics.

8. The touch panel of claim 6, wherein the substrate comprises a flexible substrate, the material of which comprises acrylics, polymethyl methacrylate (PMMA), polyacrylonitrile-butadiene-styrene (ABS), polyamide (PA), polyimide (PI), Polybenzimidazole polybutene (PB), polybutylene terephthalate (PBT), polycarbonate (PC), polyetheretherketone (PEEK), polyetherimide (PEI), polyether sulfone (PES), polyethylene (PE), polyethylene terephthalate (PET), polyethylene tetrafluoroethylene (ETFE), polyethylene oxide, polyglycolic acid (PGA), polymethylpentene (PMP), polyoxymethylene (POM), polyphenylene ether (PPE), polypropylene (PP), polystyrene (PS), polytetrafluoroethylene (PTFE), polyurethane (PU), polyvinyl chloride (PVC), polyvinyl fluoride (PVF), polyvinylidene chloride (PVDC), polyvinylidene fluoride (PVDF), or styrene-acrylonitrile (SAN).

9. A display device comprising the touch panel of claim 1, wherein the conductive layer functions as a touch electrode of the display device, and the wiring layer functions as an interconnection line of the touch electrode, and the wiring lead-out area corresponds to a border area of the display device.

10. The touch panel of claim 1, wherein the wiring layer comprises an interconnection line for touch electrodes.

11. The touch panel of claim 1, wherein conductive layer and the over coating extend partially into the second region.

12. A method of manufacturing a touch panel, comprising the following steps in sequence:

providing a substrate having a first region and a second region surrounding the first region;

forming a wiring layer on the second region;

forming a conductive layer located on the first region corresponding to a viewing area and directly covering part of the wiring layer, and an exposed part of the wiring layer being formed as a wiring lead-out area of the touch panel, the lead-out area corresponding to a lighttight border area of the touch panel, and forming an over coating directly covering on the conductive layer, wherein a material of the over coating comprises an optical cement, wherein the conductive layer is in a form of mesh structure, and the over coating is partially embedded in the conductive layer in a thickness direction thereof to expose the wiring lead-out area.

13. The method of claim 12, wherein the forming the wiring layer comprises printing, sputtering, or evaporation.

14. The method of claim 12, wherein the forming the conductive layer comprises inkjetting, spreading, gravure printing, relief printing, flexographic printing, nanoimprinting, screen printing, and blade coating, spin coating, stylus plotting, slot coating or flow coating.

15. The method of claim 12, wherein the over coating is an insulating optical cement layer.

16. The method of claim 12, wherein the forming the conductive layer comprises printing, sputtering, or evaporation.

17. The method of claim 12, wherein the substrate is a rigid substrate or a flexible substrate.

18. The method of claim 17, wherein the substrate comprises a rigid substrate, the material of which comprises glass, metal, or ceramics.

19. The touch panel of claim 12, wherein conductive layer and the over coating extend partially into the second region.

* * * * *